US011498411B2

(12) United States Patent
Frey et al.

(10) Patent No.: US 11,498,411 B2
(45) Date of Patent: Nov. 15, 2022

(54) HYDRAULIC DEVICE COMPRISING AN AIR FLOW LINE

(71) Applicant: POCLAIN HYDRAULICS INDUSTRIE, Verberie (FR)

(72) Inventors: Adam Frey, Verberie (FR); Sylvain Michon, Verberie (FR); Stéphane Vidal, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 450 days.

(21) Appl. No.: 16/627,245

(22) PCT Filed: Jun. 28, 2018

(86) PCT No.: PCT/FR2018/051597
§ 371 (c)(1),
(2) Date: Dec. 27, 2019

(87) PCT Pub. No.: WO2019/002781
PCT Pub. Date: Jan. 3, 2019

(65) Prior Publication Data
US 2020/0198415 A1 Jun. 25, 2020

(30) Foreign Application Priority Data
Jun. 30, 2017 (FR) ...................................... 1756164

(51) Int. Cl.
*B60K 7/00* (2006.01)
*B60C 23/00* (2006.01)

(52) U.S. Cl.
CPC ...... *B60K 7/0015* (2013.01); *B60C 23/00354* (2020.05); *B60C 23/00363* (2020.05);
(Continued)

(58) Field of Classification Search
CPC ............ B60K 7/0015; B60C 23/00363; B60C 23/00354; B60C 23/0039
See application file for complete search history.

(56) References Cited

U.S. PATENT DOCUMENTS 5,203,391 A * 4/1993 Fox .................... B60C 23/00318
152/416
5,253,688 A * 10/1993 Tigges .............. B60C 23/00336
301/128

(Continued)

FOREIGN PATENT DOCUMENTS

DE 102015213692 A1 * 1/2017
DE 102015213692 A1 1/2017
(Continued)

OTHER PUBLICATIONS

"Moteur hydraulique à passage central d'air comprimé", Research Disclosure, 1994, p. 289, Kenneth Mason Publications, Hampshire, United Kingdom, No. 362.

*Primary Examiner* — Katy M Ebner
(74) *Attorney, Agent, or Firm* — The Webb Law Firm

(57) ABSTRACT

The invention relates to a hydraulic device including: a stator and a rotor, in which the rotor can rotate relative to the stator about a first axis of rotation; and a shaft mounted on the rotor such as to rotate therewith. The shaft has a wheel carrier provided at a proximal end thereof and designed to receive a rim and a tire. The shaft includes a through-channel extending from the proximal end to an opposing distal end. The hydraulic device includes an air chamber formed at the distal end of the shaft and connected to the through-channel. The through-channel and air chamber are produced such as to allow a flow of air in order to control the pressure of a tire.

12 Claims, 4 Drawing Sheets

(52) U.S. Cl.
CPC .... *B60C 2200/065* (2013.01); *B60C 2200/08* (2013.01); *B60K 2007/0038* (2013.01); *B60K 2007/0092* (2013.01)

(56) References Cited

U.S. PATENT DOCUMENTS

| | | | | |
|---|---|---|---|---|
| 6,283,186 B1* | 9/2001 | Krisher | ............. | B60C 23/00345 |
| | | | | 152/417 |
| 6,325,123 B1* | 12/2001 | Gao | ................. | B60C 23/00381 |
| | | | | 152/416 |
| 6,363,985 B1* | 4/2002 | Beesley | ............ | B60C 23/00363 |
| | | | | 152/417 |
| 6,668,888 B1* | 12/2003 | Beesley | ............ | B60C 23/00363 |
| | | | | 152/417 |
| 7,185,688 B2* | 3/2007 | Hayes | ............... | B60C 23/00354 |
| | | | | 152/417 |
| 7,302,979 B2* | 12/2007 | Davison | ............ | B60C 23/00318 |
| | | | | 73/488 |
| 7,690,412 B1* | 4/2010 | Jenkinson | ........... | B60C 23/0039 |
| | | | | 152/416 |
| 9,333,813 B2* | 5/2016 | Tiziani | ............. | B60C 23/00363 |
| 9,370,974 B2* | 6/2016 | Knapke | ............. | B60C 23/00363 |
| 9,409,449 B2* | 8/2016 | Cis | .................... | B60C 23/00363 |
| 10,011,150 B2* | 7/2018 | Bonora | ............ | B60C 23/00363 |
| 10,052,923 B2* | 8/2018 | Power | ................... | B60C 23/127 |
| 10,059,156 B2* | 8/2018 | Knapke | ............ | B60C 23/00363 |
| 10,675,923 B2* | 6/2020 | Vidal | ................ | B60C 23/00363 |
| 11,034,194 B2* | 6/2021 | Falls | .................... | B60C 23/003 |
| 2009/0084481 A1* | 4/2009 | Kalavitz | .......... | B60C 23/0039 |
| | | | | 152/417 |
| 2010/0181739 A1* | 7/2010 | Eschenburg | ...... | B60C 23/00318 |
| | | | | 280/124.125 |
| 2015/0136291 A1* | 5/2015 | Grimm | ............ | B60C 23/00347 |
| | | | | 152/417 |
| 2016/0009148 A1* | 1/2016 | Berkness | ......... | B60C 23/00318 |
| | | | | 152/417 |
| 2016/0368329 A1* | 12/2016 | Vidal | ................ | B60C 23/0039 |

FOREIGN PATENT DOCUMENTS

| | | |
|---|---|---|
| FR | 3037533 A1 | 12/2016 |
| WO | 2013056988 A1 | 4/2013 |

\* cited by examiner

HYDRAULIC DEVICE COMPRISING AN AIR FLOW LINE

CROSS-REFERENCE TO RELATED APPLICATIONS

This application is the United States national phase of International Application No. PCT/FR2018/051597 filed Jun. 28, 2018, and claims priority to French Patent Application No. 1756164 filed Jun. 30, 2017, the disclosures of which are hereby incorporated by reference in their entirety.

FIELD OF THE INVENTION

The present disclosure relates to the hydraulic machines, and more specifically to the hydraulic machines driving vehicle wheels. The present disclosure relates more particularly to an inflation/deflation system for the tire of a wheel driven by a hydraulic apparatus.

STATE OF THE PRIOR ART

Vehicles whose wheels are driven by hydraulic apparatuses directly mounted on the wheel spindle are known.

In some applications such as agricultural machines or construction site machinery or under certain conditions of use, it is interesting to be able to adjust the inflation of the tires in order to vary the contact surface with the ground.

However, the production of air circulation conduits in the wheel spindles proves to be problematic. Indeed, the prior solutions propose to provide hoses to achieve the air circulation. However, it is understood that such solutions can prove to be problematic, in particular given the conditions of use of the considered vehicles, the necessary connection between the stationary air pressure generating portion and the movable portion which distributes the air pressure to the tire, thereby involving the risks of damage to such hoses.

The Applicant has thus proposed to form an air chamber directly in the bearing of the wheel spindle, as proposed in the publication FR3037533. Such a solution however proves to be binding in terms of assembly, requires sealing elements having large diameters and requires bringing a hydraulic hose close to the rim, which presents risks of detachment.

The present disclosure aims at answering at least partially these problems.

SUMMARY OF THE INVENTION

For this purpose, the present disclosure relates to a hydraulic apparatus comprising a stator and a rotor, the rotor being movable in rotation relative to the stator along a first axis of rotation,
a shaft mounted secured in rotation to the rotor, the shaft having a wheel carrier arranged at a proximal end, configured to receive a rim and a tire,
characterized in that the shaft has a through channel from the proximal end to an opposite distal end,
and in that said hydraulic apparatus comprises an air chamber formed at the distal end of the shaft and connected to the through channel, the through channel and the air chamber being made so as to allow an air circulation in order to control the pressure of a tire.

According to one example, said air chamber is isolated from the internal volume of the hydraulic apparatus by at least one sealing element.

According to one variant, said air chamber is isolated from the internal volume of the hydraulic apparatus by at least two sealing elements defining therebetween an intermediate volume.

The air chamber is typically at least partially delimited by a flange mounted on the distal end of the shaft, and comprising a release valve connecting the intermediate volume to a surrounding environment, said release valve being configured to allow air to escape toward the surrounding environment when the pressure within the intermediate volume exceeds a threshold value.

According to one example, the flange comprises an intake conduit configured to be connected to a pressure source.

According to one example, the hydraulic apparatus comprises a fluid distributor, a cylinder block defining a plurality of cylinders in which pistons arranged radially relative to the first axis of rotation are disposed, and a multilobe cam disposed opposite the cylinder block, the fluid distributor, the cylinder block and the multilobe cam being disposed around the shaft.

The distributor then typically comprises a core and a distribution casing disposed around the core, one among the distribution casing, the cam and the casing being coupled to a steering pivot so that the hydraulic apparatus is pivotally mounted along the second axis of rotation relative to the axle.

According to one example, the air chamber is isolated from the internal volume of the hydraulic apparatus by two sealing elements interposed radially between the flange and the shaft.

Said two sealing elements are then typically mounted radially inside the shaft.

The present disclosure also relates to an assembly comprising a vehicle axle and a hydraulic apparatus as defined above, the stator of the hydraulic apparatus being rotatably mounted relative to the axle via a pivot defining a second axis of rotation.

The present disclosure also relates to a vehicle equipped with such an assembly.

BRIEF DESCRIPTION OF THE DRAWINGS

The invention and its advantages will be better understood upon reading the detailed description given below of various embodiments of the invention given as non-limiting examples. This description refers to the pages of appended figures, in which.

In all the figures, the elements in common are identified by identical reference numerals.

DETAILED DESCRIPTION OF EXEMPLARY EMBODIMENTS

Figure 1:
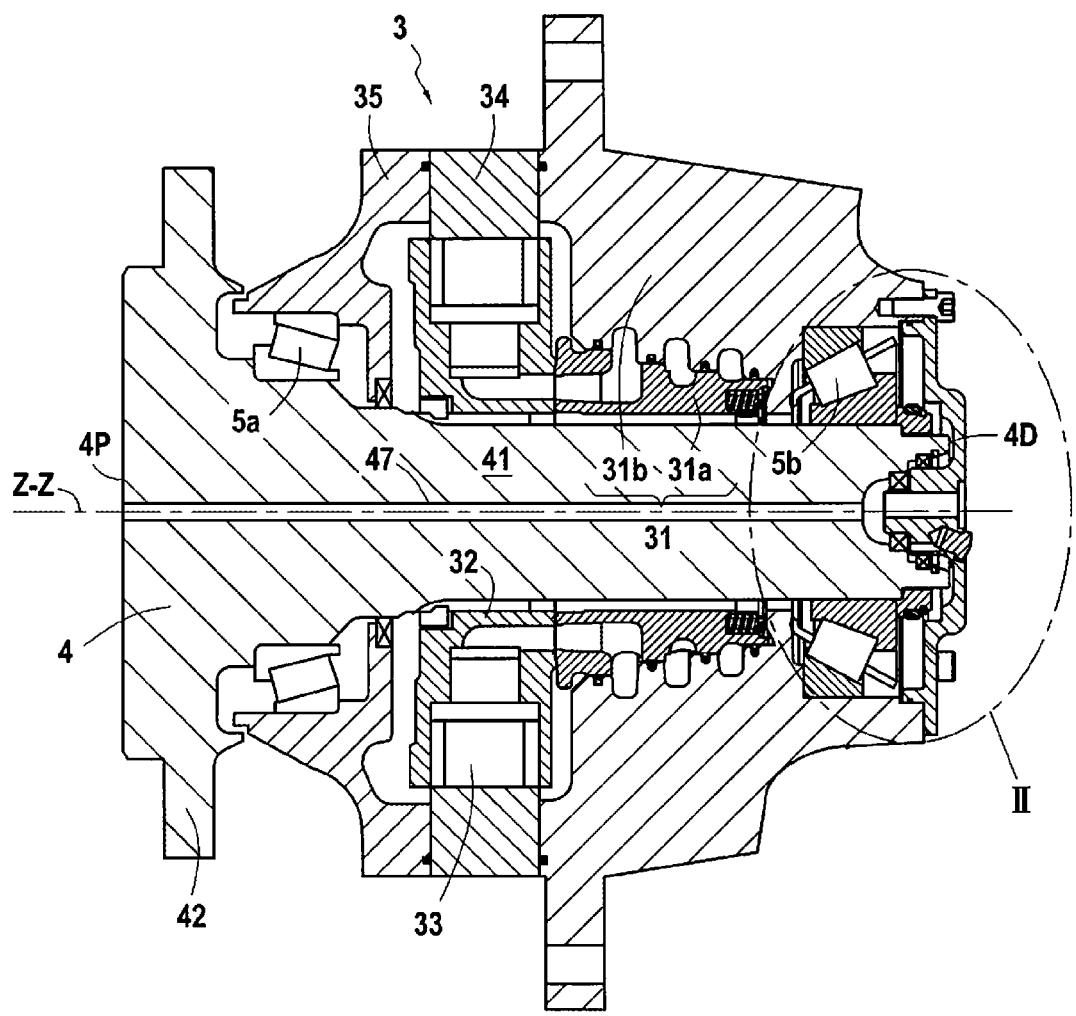
FIG. 1 represents a general view of a system according to one aspect of the invention.
Figure 2:
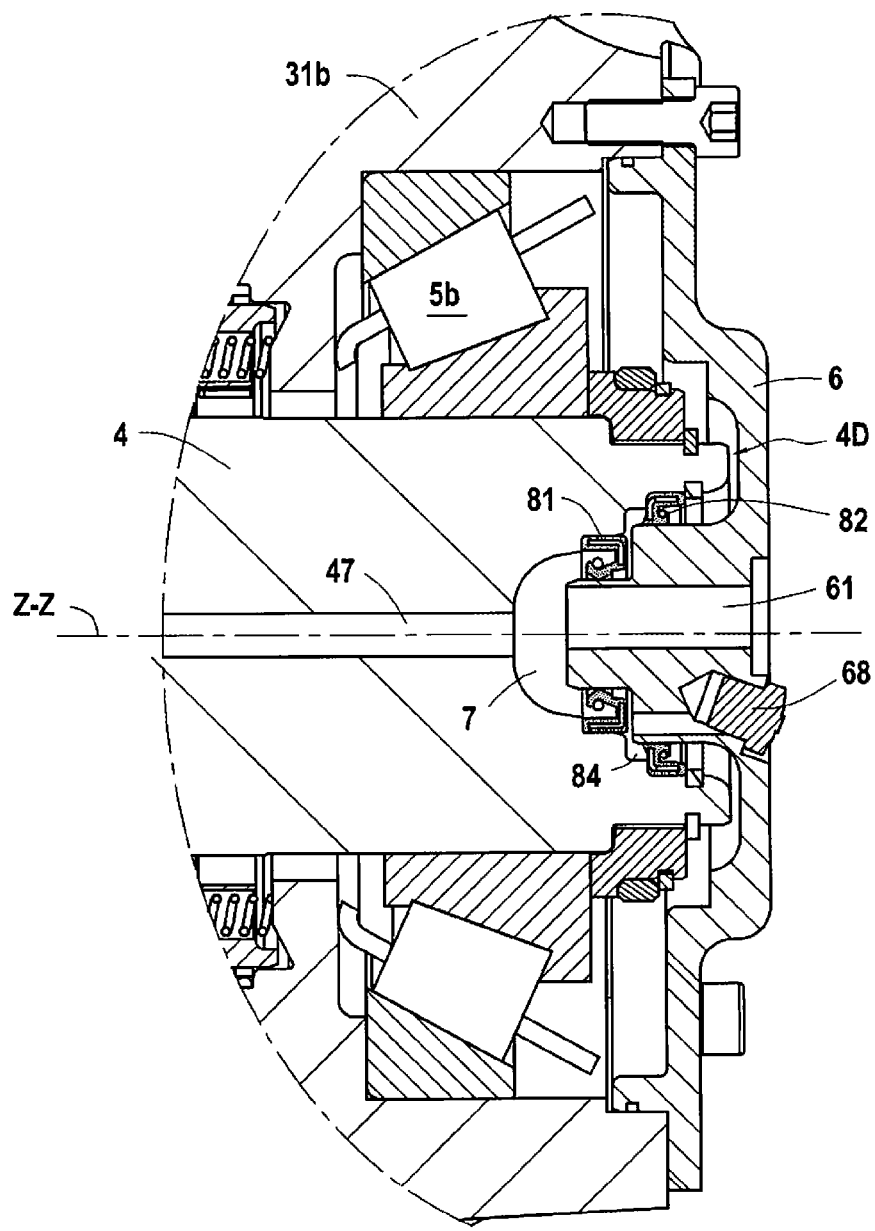
FIG. 2 is a detailed view of a portion of FIG. 1.

FIGS. 1 and 2 represent a system according to one aspect of the invention.

The system as proposed comprises an axle secured to a vehicle frame, a hydraulic apparatus 3 mounted on the axle.

The hydraulic apparatus 3 comprises a shaft 4 here forming a wheel spindle.

The hydraulic apparatus 3 is here a hydraulic multilobe cam and radial-piston apparatus. The hydraulic apparatus 3 comprises a stationary portion or stator, and a rotating portion or rotor. The stator is coupled to the axle, while the rotor is coupled to the shaft 4, so that the shaft 4 is driven along an axis of rotation Z-Z. The shaft 4 is rotatably mounted along the first axis of rotation Z-Z through a bearing 5 comprising here two rolling elements 5A and 5B. In the represented example, the rolling elements 5A and 5B are two conical rolling elements disposed in an O-mounting. As an alternative, the two rolling elements may be disposed according to an X-mounting.

The shaft 4 comprises a cylindrical portion 41 extending along the axis of rotation Z-Z, and a wheel carrier portion 42 extending from one end arbitrarily referred to as proximal end 4P of the shaft 4. This carrier portion 42 is configured to allow fixing a wheel rim carrying a tire.

As seen in the figures, the hydraulic apparatus 3 is mounted around the shaft 4, so that a distal end 4D of the shaft 4 (opposite the proximal end 4P along the axis of rotation Z-Z) is accessible.

Alternatively, the stator is coupled to the axle by means of a pivot, which defines a second axis of rotation, typically corresponding to a steering axis for a vehicle wheel. The assembly formed by the hydraulic apparatus 3 and the wheel spindle 4 can thus pivot relative to the axle 1 along this second axis of rotation.

It is understood that such an example is given by way of illustration, and that the proposed structure can also be applied for a hydraulic apparatus fixedly mounted relative to the axle. More generally, the proposed structure can be applied for a steered wheel or for a non-steered wheel of a vehicle, the structure may then be similar to but devoid of the pivot 2.

Figure 3:
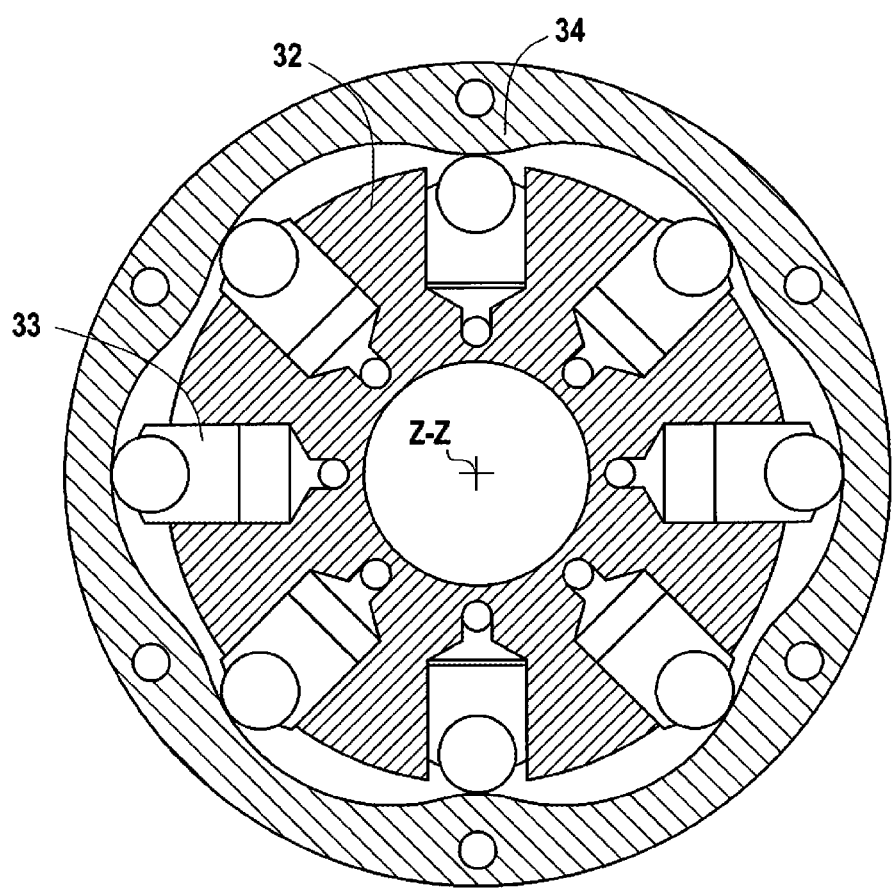
FIG. 3 is a sectional view of the hydraulic apparatus represented in FIG. 1.

The hydraulic apparatus 3 as represented comprises a distributor 31, a cylinder block 32 defining a plurality of housings in which pistons 33 arranged radially relative to the axis of rotation Z-Z slide, a multilobe cam 34 disposed around the cylinder block 32 and a casing 35 defining an internal volume. The distributor 31 comprises a core 31a and a distribution casing 31b surrounding the core 31a. FIG. 3 is thus a sectional view of the hydraulic apparatus 3, highlighting the multilobe cam 34, the cylinder block 32 and the pistons 33. The pistons 33 typically include cylindrical rollers, which cooperate with the multilobe cam 34.

Alternatively, the hydraulic apparatus 3 is an axial-piston, pallet, internal gear (commonly called gerotor) or external gear machine.

In the represented embodiment, the stationary portion relative to the axis of rotation Z-Z or stator of the hydraulic apparatus 3 is composed of the distributor 31, of the multilobe cam 34 and of the casing 35, while the rotating portion or rotor consists of the shaft 4 and of the cylinder block 32.

The rolling elements 5A and 5B are disposed on either side of the hydraulic apparatus 3, so as to frame the cylinder block 32, the multilobe cam 34 and the distributor 31. The rolling element 5A is thus disposed in the vicinity of the proximal end 4P of the shaft 4, while the rolling element 5B is disposed in the vicinity of the distal end 4D of the shaft 4. The cylinder block 32, the multilobe cam 34 and the distributor 31 are thus disposed between the rolling elements 5A and 5B. As an alternative, the rolling elements 5A and 5B are both positioned between the cylinder block 32 and the proximal end 4P of the shaft 4.

As can be understood from the above, the hydraulic apparatus 3 ensures a drive function by being capable of driving a wheel mounted on the shaft 4 in rotation about the axis of rotation Z-Z. The shaft 4 is driven by the cylinder block 32 by means of splines.

The shaft 4 further comprises a through channel 47, extending from the proximal end 4P to the distal end 4D. A flange 6 is positioned on the distal end 4D of the shaft 4, so as to isolate the rolling element 5B from the external environment, and to form an air chamber 7 in the extension of the through channel 47. The flange 6 comprises an intake conduit 61 configured to allow connecting a compressed air supply source (not represented in the figures) to the air chamber 7, and thus allow achieving an air circulation via the air chamber 7 and via the through channel 47.

The intake conduit 61 as represented passes through the flange 6 along the axis of rotation Z-Z. However, it is understood that other variants are possible, in particular the fact of forming an intake conduit in the flange 6 which would be connected to a conduit formed in the distribution casing 31b or in the casing of the hydraulic apparatus 3. As an alternative, the intake conduit 61 may be radially offset and/or inclined relative to the axis of rotation Z-Z.

It is understood that the air chamber 7 must be isolated from the internal volume of the hydraulic apparatus 3 and of the rolling elements (here the rolling element 5B) that are lubricated with oil or grease.

Sealing elements are thus interposed between the flange 6 and the shaft 4 so as to isolate the air chamber 7 from the internal volume of the hydraulic apparatus 3 and of the rolling elements 5. In the represented example, two sealing elements 81 and 82 are successively mounted between the flange 6 and the shaft 4. These two sealing elements 81 and 82 define an intermediate volume 84 between the shaft 4 and the flange 6.

The sealing element 81 is an air seal, and is interposed between the air chamber 7 and the intermediate volume 84. The sealing element 82 is an oil seal, and is interposed between the intermediate volume 84 and a volume of the hydraulic apparatus 3 comprising the rolling element 5B in the case where the latter is positioned in the vicinity of the distal end 4D of the shaft 4 (as represented in FIG. 1), or more generally a volume of the hydraulic apparatus 3 corresponding to the distributor 31, in particular in the case where the rolling elements 5A and 5B are positioned close to the proximal end 4P of the shaft 4. The sealing element 81 and the sealing element 82 are thus typically of the lip ring-type, such sealing elements being well known. The sealing elements 81 and 82 are typically interposed radially between the shaft 4 and the flange 6. In the example represented in FIG. 2, the two sealing elements are disposed radially inside the shaft 4, which makes it possible to minimize the dimension of these sealing elements 81 and 82. Such an embodiment is however not limiting; the sealing element 82 may be mounted radially outside the shaft 4, or alternatively the two sealing elements 81 and 82 may be mounted radially outside the shaft 4. At least one sealing element among the sealing elements 81 and 82 can be fixed on the flange and rubbing on the shaft or conversely fixed on the shaft and rubbing on the flange.

Figure 4:
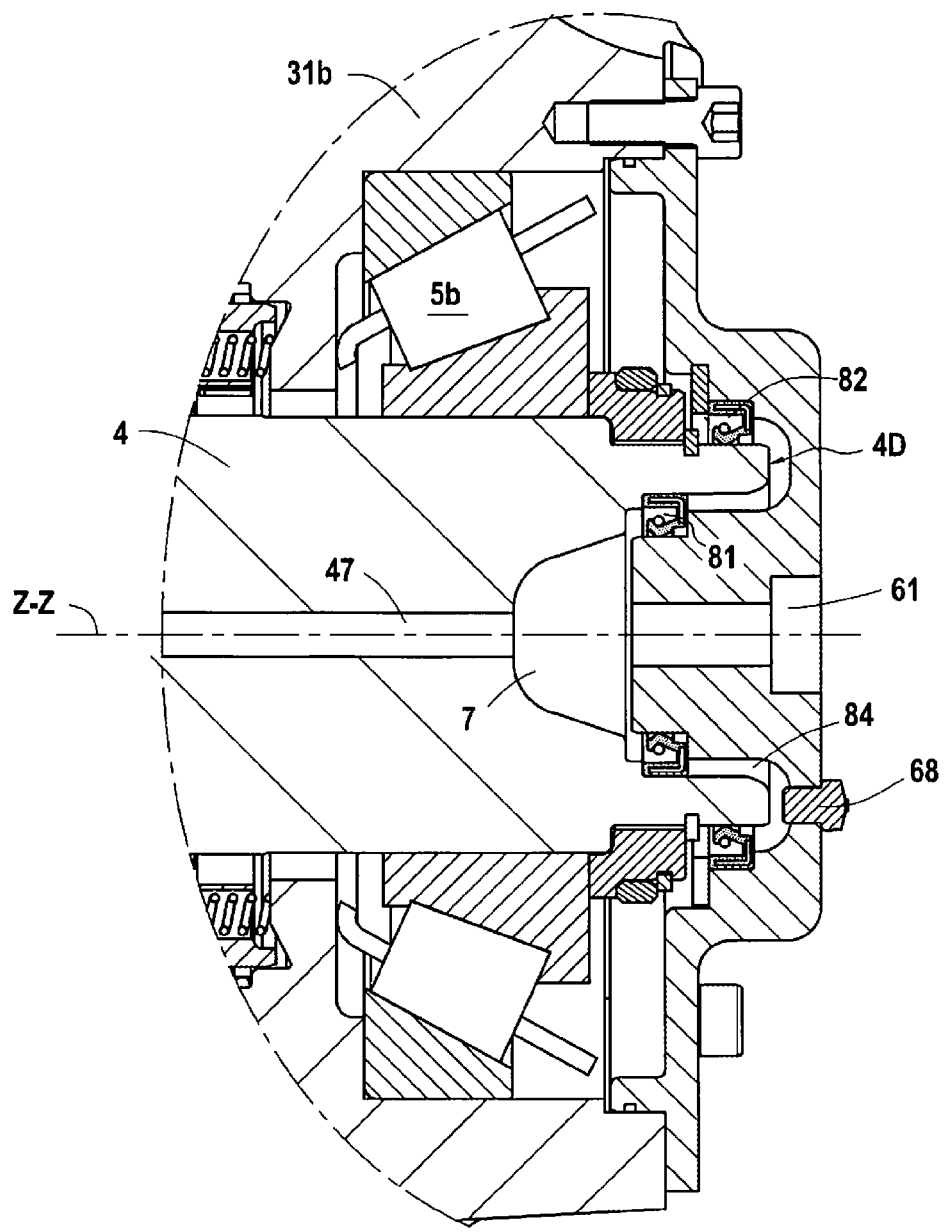
FIG. 4 represents one variant of the embodiment illustrated in FIGS. 1 and 2.

A variant of the embodiment represented in FIGS. 1 and 2 is thus represented by way of example in FIG. 4, in which the sealing element 82 is mounted on the outer periphery of the shaft 4, while the sealing member 81 remains mounted in the inner periphery of the shaft 4. The operation remains then unchanged compared to the embodiment described above.

The flange 6 typically comprises a release valve 68 disposed in a release orifice connecting the intermediate volume 84 to the surrounding environment. The release valve 68 is typically configured to allow fluid to escape from the intermediate volume 84 toward the surrounding environment when the pressure within the intermediate volume 84 exceeds a predetermined threshold value. The release valve 68 is typically configured to open for a pressure difference of less than 1 bar, for example less than 0.5 bar.

The release valve 68 thus typically allows releasing toward the surrounding environment a possible excess pressure resulting from air leakage from the air chamber 7 to the intermediate volume 84. The release valve 68 can open directly into the intermediate volume 84 or be connected therein by a channel, or be connected to the shaft 4, for example to a release conduit arranged in the shaft 4.

The combination of the flange 6, of the air chamber 7 and of the through channel 47 thus allows forming a compressed air supply line within the shaft 4 in order to adjust the pressure of a tire mounted on the shaft 4. As can be understood from the above, the proposed system retains a simple structure, and the positioning of the flange 6 and of the sealing elements 81 and 82 allows retaining sealing elements 81 and 82 having standard and small diameters, unlike solutions that would consist of making air feed conduits in the carrier portion 42 of the shaft 4, which then require the use of sealing elements of very large diameter.

The assembling of the proposed system is furthermore facilitated because of the positioning of the elements such as the flange 6 and the sealing elements 81 and 82 at a free end of the shaft 4. The flange 6 is typically fixed to the distribution casing 31b by means of a plurality of fixing screws. Alternatively, the flange 6 is formed integrally with the distribution casing 31b.

The proposed system thus makes it possible to adjust the inflation of the tires associated with the shaft 4, while ensuring protection against the stresses resulting from the use of hoses at the wheel for air transmission, which cause risks of breakage, and for the cost.

Upon reading the above, it is understood that the air chamber 7 can be formed directly in the shaft 4, or delimited by the shaft 4 and an additional element such as the flange 6, or formed by a pneumatic rotating joint positioned at the distal end of the shaft 4. More generally, it is understood that the air chamber 7 is formed at the distal end of the shaft 4 so as to be connected to the through channel 47 arranged in the shaft 4, but that several embodiments allow delimiting this air chamber 7 in order to obtain the technical effect indicated above.

Although the present invention has been described with reference to specific exemplary embodiments, it is obvious that modifications and changes can be made to these examples without departing from the general scope of the invention as defined by the claims. Particularly, individual characteristics of the various illustrated/mentioned embodiments can be combined in additional embodiments. Therefore, the description and drawings should be considered in an illustrative rather than restrictive sense.

It is also obvious that all the characteristics described with reference to one method can be transposed, alone or in combination, to one device, and vice versa, all the characteristics described with reference to one device can be transposed, alone or in combination, to one method.

The invention claimed is:

1. A hydraulic apparatus comprising a stator and a rotor, the rotor being movable in rotation relative to the stator along a first axis of rotation,
   a shaft mounted secured in rotation to the rotor, the shaft having a wheel carrier arranged at a proximal end, and configured to receive a rim and a tire,
   wherein the shaft has a through channel from the proximal end to an opposite distal end, and
   wherein the hydraulic apparatus comprises an air chamber formed at the distal end of the shaft and connected to the through channel, with the through channel and the air chamber made so to allow an air circulation in order to control the pressure of a tire.

2. The hydraulic apparatus according to claim 1, wherein said air chamber is isolated from the internal volume of the hydraulic apparatus by at least one sealing element.

3. The hydraulic apparatus according to claim 2, wherein said air chamber is isolated from the internal volume of the hydraulic apparatus by at least two sealing elements defining therebetween an intermediate volume.

4. The hydraulic apparatus according to claim 3, wherein the air chamber is at least partially delimited by a flange mounted on the distal end of the shaft, and comprising a release valve connecting the intermediate volume a surrounding environment, said release valve being configured to allow air to escape toward the surrounding environment when the pressure within the intermediate volume exceeds a threshold value.

5. The hydraulic apparatus according to claim 4, wherein the flange comprises an intake conduit configured to be connected to a pressure source.

6. The hydraulic apparatus according to claim 1, comprising a fluid distributor, a cylinder block defining a plurality of cylinders in which pistons arranged radially relative to the first axis of rotation are disposed, and a multilobe cam disposed opposite the cylinder block, with the fluid distributor, the cylinder block and the multilobe cam being disposed around the shaft.

7. The hydraulic apparatus according to claim 6, wherein the distributor comprises a core and a distribution casing disposed around the core, one among the distribution casing the cam and the casing being coupled to a steering pivot so that the hydraulic apparatus is pivotally mounted along a second axis of rotation relative to the axle.

8. The hydraulic apparatus according to claim 4, wherein the air chamber is isolated from the internal volume of the hydraulic apparatus by two sealing elements interposed radially between the flange and the shaft.

9. The hydraulic apparatus according to claim 8, wherein said two sealing elements are mounted radially inside the shaft.

10. An assembly comprising a vehicle axle and a hydraulic apparatus according to claim 1, with the stator of the hydraulic apparatus being rotatably mounted relative to the axle via a pivot defining a second axis of rotation.

11. The hydraulic apparatus according to claim 5, wherein the air chamber is isolated from the internal volume of the hydraulic apparatus by two sealing elements interposed radially between the flange and the shaft.

12. The hydraulic apparatus according to claim 11, wherein said two sealing elements are mounted radially inside the shaft.

* * * * *

UNITED STATES PATENT AND TRADEMARK OFFICE
CERTIFICATE OF CORRECTION

| | | |
|---|---|---|
| PATENT NO. | : 11,498,411 B2 | Page 1 of 1 |
| APPLICATION NO. | : 16/627245 | |
| DATED | : November 15, 2022 | |
| INVENTOR(S) | : Adam Frey et al. | |

It is certified that error appears in the above-identified patent and that said Letters Patent is hereby corrected as shown below:

In the Claims

Column 6, Line 24, Claim 4, after "volume" insert -- to --

Column 6, Line 40, Claim 7, after "casing" insert -- , --

Signed and Sealed this
Third Day of January, 2023

*Katherine Kelly Vidal*

Katherine Kelly Vidal
*Director of the United States Patent and Trademark Office*